(12) United States Patent
Zalay et al.

(10) Patent No.: US 8,868,162 B2
(45) Date of Patent: Oct. 21, 2014

(54) METHOD AND ATTENUATOR FOR DETECTION AND ITERATIVE ATTENUATION OF SPIKES IN COMPLEX SIGNALS

(75) Inventors: Osbert C. Zalay, Toronto (CA); Berj L. Bardakjian, Toronto (CA)

(73) Assignee: Neurochip Corporation, Ontario (CA)

( * ) Notice: Subject to any disclaimer, the term of this patent is extended or adjusted under 35 U.S.C. 154(b) by 699 days.

(21) Appl. No.: 12/582,407

(22) Filed: Oct. 20, 2009

(65) Prior Publication Data

US 2010/0113951 A1 May 6, 2010

Related U.S. Application Data

(60) Provisional application No. 61/106,949, filed on Oct. 20, 2008.

(51) Int. Cl.
*A61B 5/04* (2006.01)
*G01D 3/032* (2006.01)

(52) U.S. Cl.
CPC ...................................... *G01D 3/032* (2013.01)
USPC ........... 600/509; 600/544; 702/66; 324/76.12

(58) Field of Classification Search
USPC ................. 607/27, 28; 600/509, 544; 702/66; 324/76.12
See application file for complete search history.

(56) References Cited

U.S. PATENT DOCUMENTS

| | | | |
|---|---|---|---|
| 5,966,684 A | 10/1999 | Richardson et al. | |
| 6,219,376 B1 | 4/2001 | Zhodzishsky et al. | |
| 2003/0060855 A1* | 3/2003 | Casset et al. | 607/27 |
| 2005/0113703 A1* | 5/2005 | Farringdon et al. | 600/509 |
| 2006/0233453 A1 | 10/2006 | Behiels et al. | |
| 2007/0066908 A1* | 3/2007 | Graupe et al. | 600/511 |

OTHER PUBLICATIONS

International Search Report and Written Opinion dated Jan. 8, 2010.
K.L. Coburn et al., *Facts and Artifacts in Brain Electrical Activity Mapping*, Brain Topology 1, (1):37-45, 1988.
A.A. Faisal et al., *Noise in the Nervous System*, Nature Reviews Neuroscience, 9(4):292-303, 2008.
P. Faure et al., *A Nonrandom Dynamic Component in the Synaptic Noise of a Central Neuron*, Proceedings of the National Academy of Sciences, 94(12):6506-6511, 1997.
G. Jacobson et al., *Subthreshold Voltage Noise of Rat Neocortical Pyramidal Neurons*, Journal of Physiology, 564(Pt 1):145-160, 2005.

* cited by examiner

*Primary Examiner* — Catherine Voorhees
(74) *Attorney, Agent, or Firm* — Harness, Dickey & Pierce, PLC (57) ABSTRACT

A method of attenuating spikes in a complex signal comprises examining the complex signal to detect spikes therein and for each detected spike, generating an estimate inverse signal and applying the estimate inverse signal to the complex signal to attenuate the spike associated with the estimate inverse signal.

29 Claims, 6 Drawing Sheets

METHOD AND ATTENUATOR FOR DETECTION AND ITERATIVE ATTENUATION OF SPIKES IN COMPLEX SIGNALS

CROSS-REFERENCE TO RELATED APPLICATIONS

This application claims the benefit of U.S. Provisional Application No. 61/106,949 filed on Oct. 20, 2008 to Zalay entitled "Method for Detection and Iterative Attenuation (Melting) of Large-Amplitude Spikes or Artifacts in Discrete-Time Biological Signals", the content of which is incorporated herein by reference.

FIELD OF THE INVENTION

The present invention relates generally to signal processing and in particular, to a method and attenuator for attenuating spikes in complex signals.

BACKGROUND OF THE INVENTION

Analyzing temporally and spectrally complex signals is challenging and requires the use of specialized techniques. Such temporally and spectrally complex signals include for example biological signals (e.g. neural and cardiac signals), noisy or artifact-contaminated communication signals, signals produced by mechanical or electronic measurement or sensing devices (e.g. spectrometers, acoustic transducers etc.) and environmental signals (e.g. atmospheric, oceanic, seismic and astronomic signals). Despite the popularity of Fourier transform-based methods, such methods are ill-suited to deal with non-stationary complex signals. As an alternative, wavelet transform-based methods have proven to be versatile and effective, with improved ability to resolve complex signal features in both the time and frequency domains.

Large amplitude spikes are common features in temporally and spectrally complex signals. For example, in the case of neural signals, large amplitude spikes may occur spontaneously and/or as a byproduct of stimulation. Unfortunately, large amplitude spikes or artifacts can obscure complex signal components that are relevant to clinical/research diagnosis and/or analysis since their dominant spectral power masks smaller amplitude complex signal features that may be temporally localized at the same regions as the large amplitude spikes. If large amplitude spikes are associated with an underlying rhythm and require removal, then wavelet transform-based methods alone are not capable of eliminating all spike remnants, since spikes with large amplitudes in relation to the rest of the complex signal tend to dominate the coefficients of the wavelet transform across all frequency bands being analyzed.

For example, electroencephalogram (EEG) artifacts may originate from various physiological and external sources (e.g. eye blinking, muscular movement, cardiac potentials, etc.) and can pose difficulties for EEG analysis, as noted in the publications entitled "Methods for the estimation and removal of artifacts and overlap in ERP waveforms" authored by D. Talsma et al., *Event-Related Potentials: A Methods Handbook*, MIT Press, 2005, p. 115-148 and "Facts and artifacts in brain electrical activity mapping" authored by K. L. Coburn et al., *Brain Topology* 1, (1):37-45, 1988. In another example, isolation of the baseline complex signal in intracellular neuronal recordings is sometimes warranted due to active research into forms of subthreshold neuronal noise and their role in synaptic function and neuronal communication, making action potential attenuation or removal desirable as noted in the publications entitled "Noise in the nervous system" authored by A. A. Faisal et al., *Nature Reviews Neuroscience*, 9(4):292-303, 2008, "A nonrandom dynamic component in the synaptic noise of a central neuron" authored by P. Faure et al., *Proceedings of the National Academy of Sciences*, 94(12):6506-6511, 1997, and "Subthreshold voltage noise of rat neocortical pyramidal neurons" authored by G. Jacobson et al., *Journal of Physiology*, 564(Pt 1):145-160, 2005.

Several techniques have been devised to remove large amplitude spikes from complex signals. One approach involves interpolating the baseline potential of the complex signal before and after each spike following its excision, and then lowpass filtering the complex signal. Unfortunately, lowpass filtering the complex signal may remove other high-frequency components in the complex signal not associated with spike artifacts. A cruder method relies on direct bandpass filtering to attenuate dominant-frequency spike components of the complex signal, but this approach usually distorts the underlying complex signal as well.

As will be appreciated, improvements in complex signal analysis are desired. It is therefore an object of the present invention to provide a novel method and attenuator for attenuating spikes in complex signals.

SUMMARY OF THE INVENTION

Accordingly, in one aspect there is provided a method of attenuating spikes in a complex signal comprising examining the complex signal to detect spikes therein; and for each detected spike, generating an estimate inverse signal and applying the estimate inverse signal to the complex signal to attenuate the spike associated with the estimate inverse signal.

In one embodiment, the examining comprises comparing the amplitude of the complex signal with a threshold value to detect spikes in the complex signal. Prior to the examining, the values of the complex signal are digitally stored in an array. For each value of the complex signal, the value is compared to a plurality of preceding and subsequent values of the complex signal to determine if the value represents a peak and if so, the value of the complex signal is compared to the threshold value.

In one embodiment, during the generating a scaled mirror image of the detected spike is generated. The generating and applying are performed iteratively until the amplitude of the spike is sufficiently attenuated.

Following the applying, the attenuated complex signal may be filtered such as for example wavelet or wavelet packet filtered. The complex signal may be a biological signal such as a neural or cardiac signal or one of a noisy and/or an artifact-contaminated communication signal, a mechanical measurement or sensing device signal, an electronic measurement or sensing device signal and an environment signal.

According to another aspect of the present invention there is provided a method of attenuating spikes in a complex signal comprising subjecting the complex signal to thresholding to detect spikes in the complex signal having amplitudes greater than a first threshold value and subjecting each detected spike to an iterative inverse signal application procedure to attenuate each detected spike so that the amplitude thereof is reduced at least to a second threshold value.

According to yet another aspect there is provided a computer readable medium embodying a computer program for attenuating spikes in a complex signal, said computer program comprising program code for examining the complex signal to detect spikes therein, program code for generating an estimate inverse signal for each detected spike and program code for applying the estimate inverse signal to the complex signal to attenuate the spike associated with the estimate inverse signal.

According to yet another aspect there is provided a computer readable medium embodying a computer program for attenuating spikes in a complex signal, said computer program comprising program code for subjecting the complex signal to thresholding to detect spikes in the complex signal having amplitudes greater than a first threshold value and program code for subjecting each detected spike to an iterative inverse signal application procedure to attenuate each detected spike so that the amplitude thereof is reduced at least to a second threshold value.

According to still yet another aspect there is provided an attenuator for attenuating spikes in a complex signal comprising a spike detector for detecting spikes in the complex signal and a spike attenuator for attenuating each detected spike, said spike attenuator generating, for each detected spike, an estimate inverse signal and applying the estimate inverse signal to the complex signal thereby to attenuate the spike associated with the estimate inverse signal.

According to still yet another aspect there is provided an attenuator for attenuating spikes in a complex signal comprising a threshold detector for detecting spikes in the complex signal that have amplitudes greater than a first threshold value and an attenuating loop for subjecting each detected spike to an iterative inverse signal application procedure to attenuate each spike to reduce the amplitude thereof to at least a second threshold value.

BRIEF DESCRIPTION OF THE DRAWINGS

Embodiments will now be described, by way of example only, with reference to the accompanying drawings in which.

DETAILED DESCRIPTION OF THE PREFERRED EMBODIMENTS

In the following, a technique to remove large amplitude spikes from a time series complex signal is described. The technique employs amplitude threshold detection to detect large amplitude spikes in the complex signal and then uses the detected spikes' own rescaled mirror images to iteratively attenuate or "melt" the detected spikes down. Therefore, large amplitude spikes in the complex signal are not filtered out or excised from the complex signal but rather, are transformed so that their prominent high-frequency components and spectral power are greatly diminished. This approach aims to attenuate detected large amplitude spikes in the complex signal to blend the spikes in with their surroundings, rather than remove the spikes completely, so that as much information as possible is preserved in the complex signal before other filtering, such as wavelet packet filtering, is performed.

Figure 1A:
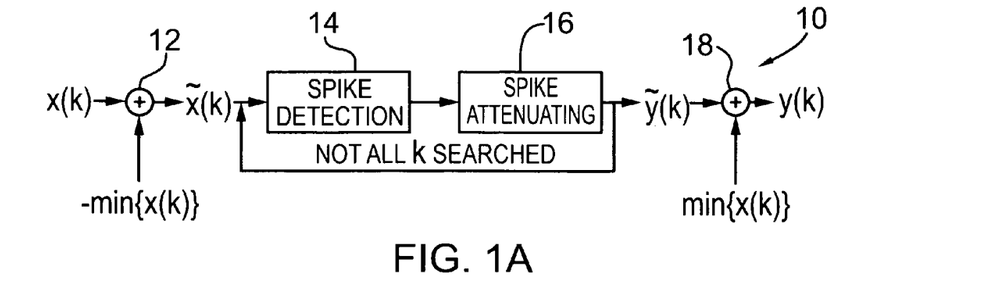
FIG. 1A is a schematic diagram of an attenuator for attenuating spikes in complex signals.

Turning now to FIG. 1A, an attenuator for attenuating spikes in a complex signal is shown and is generally identified by reference numeral 10. In this embodiment, attenuator 10 is designed to attenuate large amplitude spikes in a biological signal such as for example a neural or cardiac signal. As can be seen, attenuator 10 comprises an adder 12 that receives a recorded complex signal x(k) to be processed as well as the negative of the minimum value of the complex signal $-\min\{x(k)\}$. The output $\tilde{x}(k)$ of adder 12 is applied to a spike detection loop 14. The spike detection loop 14 communicates with a spike attenuating loop 16. The output $\hat{y}(\hat{k})$ of the spike attenuating loop 16 is applied to an adder 18. Adder 18 also receives the minimum value of the complex signal $\min\{x(k)\}$, and yields the attenuated complex signal y(k) output of the attenuator 10.

Figure 1B:
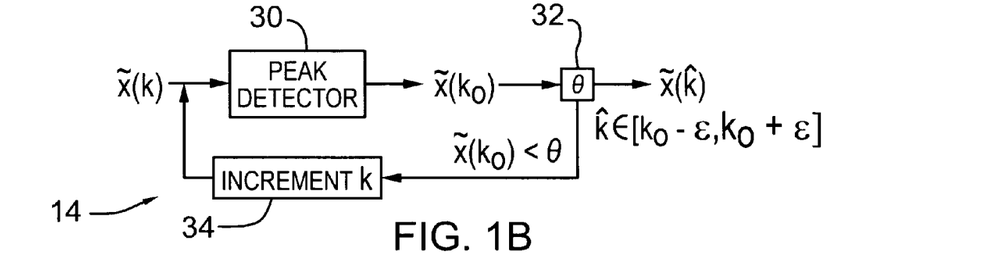
FIG. 1B is a schematic diagram of a spike detection loop forming part of the attenuator of FIG. 1A.

FIG. 1B better illustrates the spike detection loop 14. As can be seen, spike detection loop 14 comprises a peak detector 30 that receives the output $\tilde{x}(k)$ of the adder 12. The peak detector 30 communicates with a threshold detector 32 and with an indexor 34. Indexor 34 also communicates with the threshold detector 32 and provides feedback to the peak detector 30.

Figure 1C:
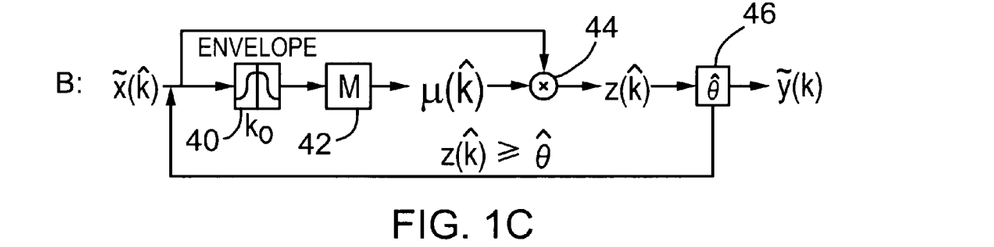
FIG. 1C is a schematic diagram of a spike attenuating loop forming part of the attenuator of FIG. 1A.

FIG. 1C better illustrates the spike attenuating loop 16. As can be seen, the spike attenuating loop 16 comprises an envelope detector 40 that receives output of the spike detection loop 14 and communicates with an inverse signal generator 42. The output of the inverse signal generator 42 is applied to a multiplier 44 that also receives the output of the spike detection loop 14. The multiplier 44 communicates with a threshold detector 46. The threshold detector 46 communicates with the adder 18 and with the envelope detector 40.

The general operation of the attenuator 10 will now be described. When a recorded complex signal x(k) is applied to the attenuator 10, the spike detection loop 14 examines the complex signal and uses amplitude thresholding to detect large amplitude spikes in the complex signal. For each large amplitude spike in the complex signal that is detected, the spike attenuating loop 16 generates an inverse signal that, when combined with the complex signal in an iterative loop, attenuates the associated large amplitude spike so that the prominent high-frequency components and spectral power of the large amplitude spike are greatly diminished. In this manner, large amplitude spikes in the complex signal can be effectively diminished while preserving the integrity of the original complex signal x(k). Further specifics concerning the operation of the attenuator 10 will now be described with particular reference to FIGS. 1D and 1E.

Figure 1D:
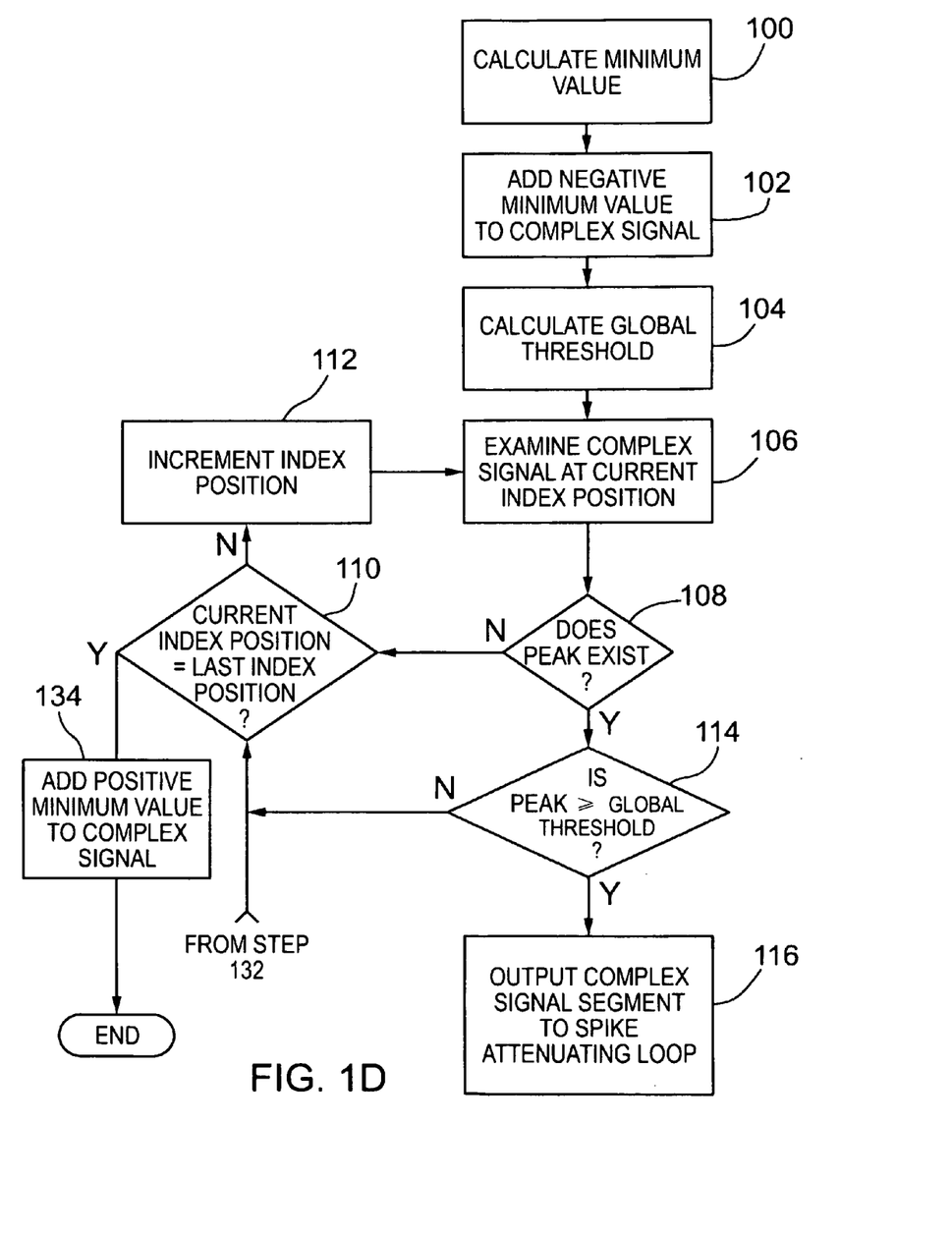
FIG. 1D is a flowchart showing steps performed by the spike detection loop of FIG. 1B.

Prior to processing a recorded complex signal x(k) to remove large amplitude spikes, the recorded complex signal is examined and the minimum value of the complex signal min{x(k)} is determined by digitally storing the values of the complex signal in an input floating point array and searching the array for the smallest stored value (step 100). The recorded complex signal x(k) is then applied to the attenuator 10 and delivered to the adder 12, which also receives the negative of the minimum value of the complex signal −min{x(k)} determined at step 100. At adder 12, the negative of the minimum value of the complex signal −min{x(k)} is added to the values of the complex signal x(k) in the input floating point array, so that all values of the resultant complex signal are non-negative (step 102). The complex signal output of the adder 12 is therefore expressed as:

$$x(k) - \min\{x(k)\} = \tilde{x}(k), \text{ where } \tilde{x}(k) \geq 0 \text{ for all } k \in Z.$$

A global threshold value $\theta$ is then computed for the non-negative complex signal (step 104). The global threshold value $\theta$ may vary depending on the nature of the complex signal being processed. In this embodiment, the global threshold value $\theta$ is proportional to the root mean square of the non-negative complex signal and is expressed as:

$$\theta = C\sqrt{\overline{[\tilde{x}(k)]^2}}$$

where $C \geq 1$ and the bar denotes the mean value $$\left(\text{i.e. } \overline{u(k)} = \sum_{k=1}^{N} u(k)/N\right).$$

The proportionality constant C is greater than or equal to one (1) because it is desirable to detect spikes having amplitudes that are beyond the range of the average complex signal baseline activity.

The non-negative complex signal $\tilde{x}(k)$ stored in the input floating point array is then applied to the peak detector 30. At the peak detector 30, the value of the non-negative complex signal $\tilde{x}(k)$ at a current index position $k_o$ of the input floating point array is compared to the values of the non-negative complex signal at a plurality of index positions (typically two (2) to five (5) indices) of the input floating point array preceding and subsequent to the current index position $k_o$ to determine if the value of the non-negative complex signal $\tilde{x}(k)$ at the current index position $k_o$ represents a local maximum or peak in the non-negative complex signal $\tilde{x}(k)$ (steps 106 and 108). If the peak detector 30 does not detect a local maximum in the non-negative complex signal $\tilde{x}(k)$ at the current index position $k_o$, the value of the non-negative complex signal $\tilde{x}(k)$ at the current index position $k_o$, is copied to the corresponding index position of an output floating point array. The peak detector 30 then signals the indexor 34. The indexor 34 in response examines the current index position $k_o$ to determine if it represents the last index position of the input floating point array (step 110). If not, the indexor 34 increments the current index position by one (1) (step 112) and the process returns to step 106. As a result, the peak detector 30 examines the value of the non-negative complex signal $\tilde{x}(k)$ at the updated index position to determine if it represents a local maximum or peak in the non-negative complex signal $\tilde{x}(k)$. This process continues until the peak detector 30 detects a local maximum in the non-negative complex signal $\tilde{x}(k)$ or until the indexor 34 determines that the current index position is equal to the last index position of the input floating point array at step 110.

When the peak detector 30 detects a value of the non-negative complex signal $\tilde{x}(k)$ that represents a local maximum or peak, the threshold detector 32 compares the value of the non-negative complex signal with the global threshold value $\theta$ (step 114). If the value of the non-negative complex signal is less than the global threshold value $\theta$ (i.e. $\tilde{x}(k_o) < \theta$), the value of the non-negative complex signal $\tilde{x}(k)$ is determined not to be a large amplitude spike. In this case, the value of the non-negative complex signal $\tilde{x}(k)$ at the current index position $k_o$ is copied to the corresponding index position of the output floating point array. The threshold detector 32 then signals the indexor 34 and the process reverts to step 110. The indexor 34 in response examines the current index position to determine if it represents the last index position of the input floating point array. If not, the indexor 34 increments the current index position by one (1) (step 112) and the peak detector 30 examines the value of the non-negative complex signal $\tilde{x}(k)$ at the updated index position of the input floating point array to determine if it represents a local maximum or peak.

If the value of the non-negative complex signal $\tilde{x}(k)$ is greater than or equal to the global threshold value $\theta$ (i.e. $\tilde{x}(k_o) \geq \theta$), the value of the non-negative complex signal is deemed to represent a large amplitude spike. The spike detection loop 14 in turn copies a segment of the non-negative complex signal $\tilde{x}(k)$ stored in the input floating point array and outputs the copied segment to the spike attenuating loop 16 (step 116). The copied segment of the non-negative complex signal $\tilde{x}(k)$ includes the detected large amplitude spike and values of the non-negative complex signal at index positions of the input floating point array that are neighbours to the detected large amplitude spike. The neighbour index positions of the input floating point array are expressed by $\hat{k} \in [k_o - \epsilon, k_o + \epsilon]$, which is an interval subset of k defined in the neighborhood $\epsilon$ of the identified large amplitude spike. The choice of the neighborhood $\epsilon$ is made by inspecting the complex signal visually or by automated measurement before application of the segment to the spike attenuating loop 16 with the condition that the detected large amplitude spike width is less than $2\epsilon$. The value for the neighborhood $\epsilon$, is chosen so that it is large enough to encompass each large amplitude spike or large amplitude spike cluster (if a number of large amplitude spikes are tightly grouped) without overlapping the next large amplitude spike.

Figure 1E:
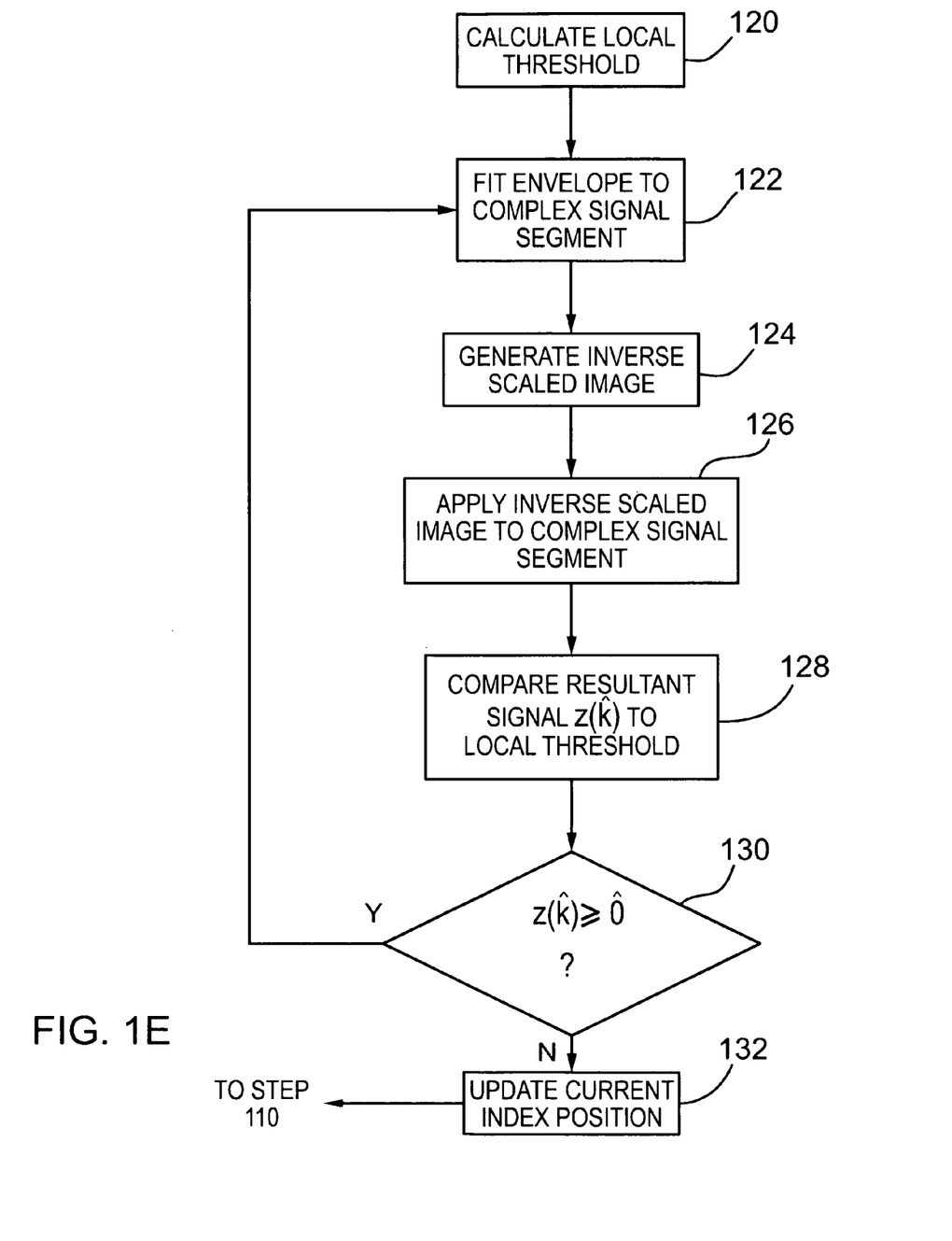
FIG. 1E is a flowchart showing steps performed by the spike attenuating loop of FIG. 1C.

Before the non-negative complex signal segment is processed by the spike attenuating loop 16, a local threshold value $\hat{\theta}$ based on the values of the non-negative complex signal segment is computed (step 120). In this embodiment, the local threshold value $\hat{\theta}$ is equal to:

$$\hat{\theta} = \hat{C}\sqrt{\overline{[\tilde{x}(k)]^2}}$$

where $(0 < \hat{C} \leq 1)$. The proportionality constant $\hat{C}$ is approximately one (1) or less so that the amplitude of the large amplitude spike is attenuated to within a range equivalent to or less than that of the average complex signal baseline activity in its neighborhood.

With the local threshold value $\hat{\theta}$ determined, the envelope detector 40 fits a sigmoidal envelope around the large amplitude spike in the non-negative complex signal segment (step 122) such that:

$$\Omega(k) = \left( \frac{1}{1+\exp(-(\xi_1/2\varepsilon)(\hat{k}-k_o+\xi_2\varepsilon))} - \frac{1}{1+\exp(-(\xi_1/2\varepsilon)(\hat{k}-k_o+\xi_2\varepsilon))} \right)$$

where $\xi_1$ and $\xi_2$ are parameters adjusting the edge slant and relative width of the sigmoidal envelope, respectively. The properties of the sigmoidal envelope as controlled by $\xi_1$ and $\xi_2$ affect both the isolation of the large amplitude spike from its surroundings, and preservation of the complex signal baseline activity from the effects of the spike attenuating transformation. As such, $\xi_1$ is chosen to be large enough to enable sharp delineation of the large amplitude spike from its neighborhood, and $\xi_2$ is chosen to be some fraction in relation to the neighborhood radius, $\epsilon$. For example, parameter choices that are adequate for most time series complex signals are $\xi_1=100$ and $\xi_2=0.2$.

With the sigmoidal envelope fitted around the large amplitude spike, the inverse signal generator 42 generates an inverse scaled image of the large amplitude spike (step 124) according to:

$$\mu(\hat{k}) = 1 - (1-\eta) \cdot \Omega(\hat{k}) \frac{\tilde{x}(\hat{k})}{\max\{\tilde{x}(\hat{k})\}}$$

with scaling $0 \ll \eta < 1$ (i.e. arbitrarily close to 1). A parameter choice $\eta=0.999$ has been shown to be satisfactory.

The inverse scaled image of the large amplitude spike is then applied to the multiplier 44 which also receives the non-negative complex signal segment output by the threshold detector 32 (step 126). The product output $z(\hat{k})$ of the multiplier 44 which is expressed as:

$$z(\hat{k}) = \mu(\hat{k}) \cdot \tilde{x}(\hat{k})$$

is used to update the values of the non-negative complex signal segment. The updated values of the non-negative complex signal segment are then applied to the threshold detector 46. The threshold detector 46 compares the updated values of the non-negative complex signal segment (i.e. the resultant product output $z(\hat{k})$) with the local threshold value $\hat{\theta}$ (steps 128 and 130). If the amplitude of any of the updated values of the non-negative complex signal segment is greater than or equal to the local threshold value $\hat{\theta}$ (i.e. $z(\hat{k}) \geq \hat{\theta}$ for any $\hat{k}$), steps 122, 124 and 126 as described above are performed again using the updated values of the non-negative complex signal segment. This iterative process continues until the updated values of the non-negative complex signal segment (i.e. the product output $z(\hat{k})$ of the multiplier 44) are less than the local threshold value $\hat{\theta}$, or the number of permitted iterations has reached an allowed limit.

When the threshold detector 46 determines that the product output $z(\hat{k})$ of the multiplier 44 is less than the local threshold value $\hat{\theta}$, signifying that the large amplitude spike has been sufficiently attenuated, the updated values of the non-negative complex signal segment are copied to corresponding index positions of the output floating point array. The threshold detector 46 then signals the indexor 34 to update the current index position so that it is equal to the last index position of the non-negative complex signal segment that was copied to the output floating point array (step 132). The process then reverts to step 110 where the indexor 34 examines the current index position to determine if it represents the last index position of the input floating point array. If not, the indexor 34 increments the current index position by one (1) and above process is performed on the non-negative complex signal $\tilde{x}(k)$ at the next index position of the input floating point array. After the non-negative complex signal $\tilde{x}(k)$ has been processed as described above, the processed non-negative complex signal $\tilde{y}(k)$ stored in the output floating point array is applied to the adder 18. The adder 18 which also receives the minimum value of the complex signal $\min\{x(k)\}$ adds the minimum value of the complex signal to the values of the complex signal $\tilde{y}(k)$ in the output floating point array (step 134) and outputs the resultant attenuated complex signal $y(k)$.

Figure 2:
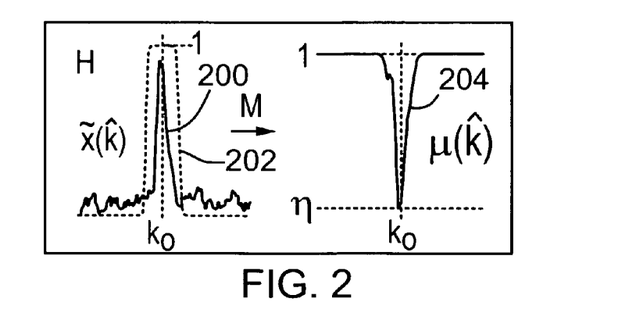
FIG. 2 shows a spike in a complex signal and a scaled mirror image of the spike.

FIG. 2 shows an example of a large amplitude spike 200 in a complex signal that is detected together with a scaled mirror image 204 of the large amplitude spike as generated by the inverse signal generator 42. In this example, the large amplitude spike has a peak amplitude of H and is located at index position $k_o$. The sigmoidal envelope fitted around the large amplitude spike 200 is shown by dotted line 202. As described above, a scaled inversion transformation is carried out to obtain the scaled mirror image 204 of the large amplitude spike $\mu(\hat{k})$, which is used to attenuate the large amplitude spike through repeated multiplication. During the iterative process, the most prominent features of the large amplitude spike 200 are reduced the fastest. The baseline complex signal is left virtually untouched.

Figure 3A:
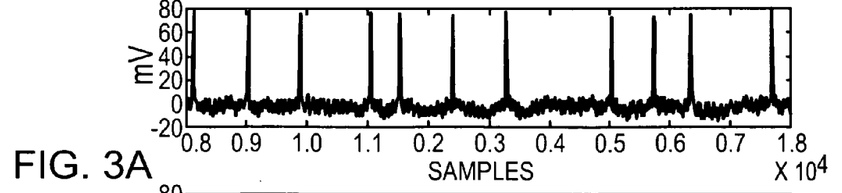
FIG. 3A shows a time series complex signal having large amplitude spikes.
Figure 3B:
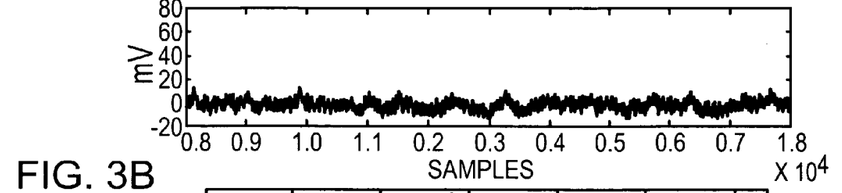
FIG. 3B shows the time series complex signal of FIG. 3A after processing by the attenuator of FIG. 1.
Figure 4:
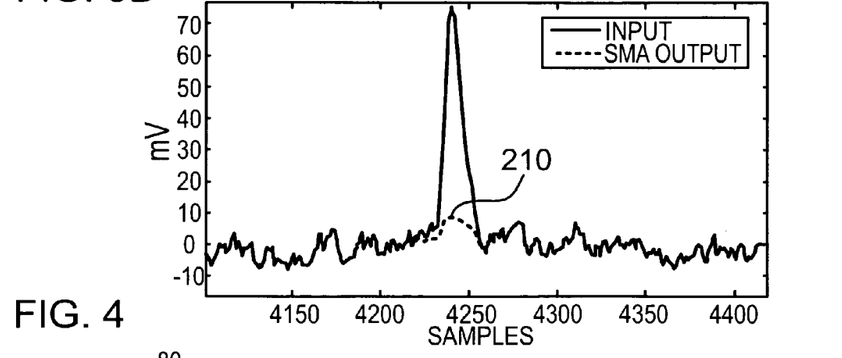
FIG. 4 shows a portion of the time series complex signal of FIG. 3A before and after processing by the attenuator of FIG. 1.

FIGS. 3A and 3B shows a time series complex signal containing large amplitude spikes before and after processing by the attenuator 10. FIG. 4 is an enlarged view of a portion of the time series complex signal of FIG. 3A showing one large amplitude spike. The dotted line 210 represents the transformed spike once it has been attenuated.

Figure 5A:
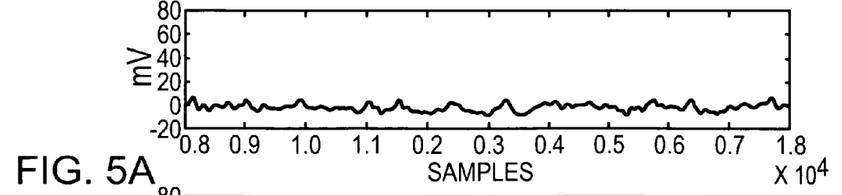
FIG. 5A shows a complex signal that has been processed by the attenuator of FIG. 1 to attenuate spikes and then subsequently low-pass filtered.
Figure 5B:
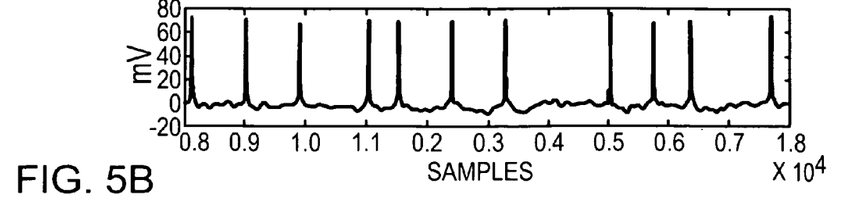
FIG. 5B shows the complex signal of FIG. 5A with attenuated large amplitude spikes re-introduced.

If information about spike amplitude and phase is important, as in the case with action potentials in an intracellular neuronal recording, as information concerning the phases and amplitudes of removed large amplitude spikes is not lost, large amplitude spikes that have been removed from a complex signal can be re-introduced to a post processed complex signal as shown in FIGS. 5A and 5B.

If the time series complex signal contains biphasic large amplitude spikes or large amplitude spike components of negative polarity, the input time series can be inverted such that $[x(k)]_{inverted} = -x(k)$ prior to processing to eliminate the negative large amplitude spike components. Alternatively, the threshold definitions for detection and attenuation can be reconfigured to detect and attenuate large amplitude spikes of negative polarity.

Figure 6A:
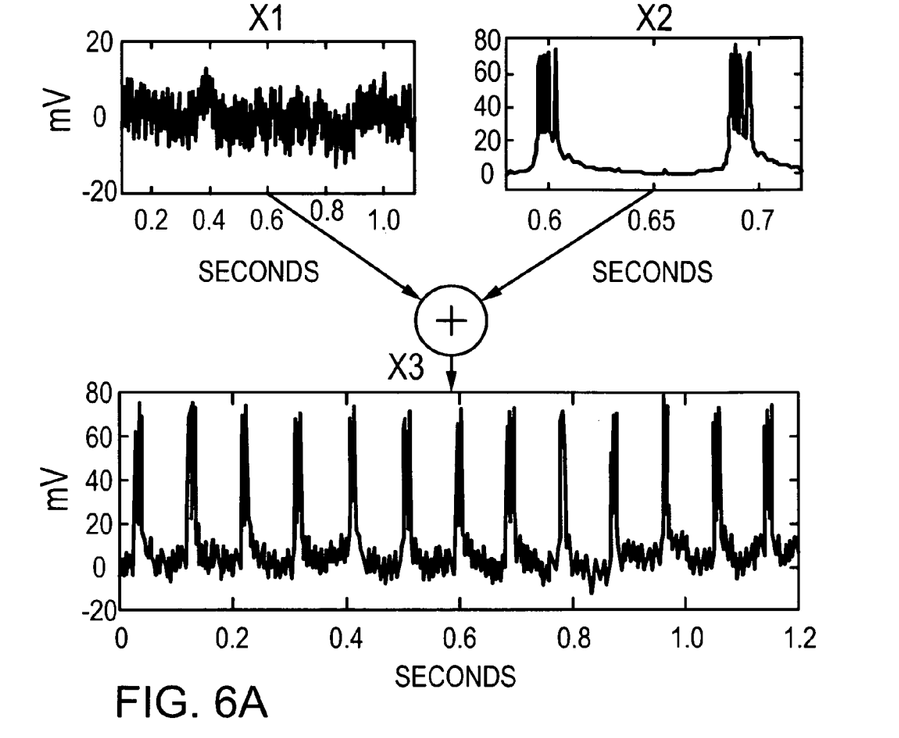
FIG. 6A shows a composite complex signal with large amplitude spikes formed from the combination of a rhythmic signal and a large amplitude bursting-spike signal.

In order to effectively remove large amplitude spikes or extract their underlying rhythms from complex signals such as neural recordings, the complex signals should be applied to the attenuator 10 in advance of other filtering methods, such as for example the wavelet packet rhythm extraction method described in co-pending U.S. application Ser. No. 12/582,563 to Zalay et al. filed on even date herewith and entitled "Method and Rhythm Extractor for Detecting and Isolating Rhythmic Signal Features from an Input Signal Using the Wavelet Packet Transform" and assigned to Neurochip Corporation of Ontario, Canada, assignee of the subject application now U.S. Pat. No. 8,315,970, the content of which is incorporated herein by reference. In FIG. 6A, a composite complex signal (X3) made up of an intracellularly recorded baseline rhythmic signal (X1) and a large amplitude burstingspike signal (X2) is shown that was simulated using coupled oscillators. Composite complex signal X3 is similar in form to interictal bursting activity recorded intracellularly from neurons. As is typically the case with neuronal recordings, the subthreshold activity and the spiking activity are both independently rhythmic.

To quantify the signals (X1) and (X3), each signal is subdivided into time segments. In this example, each signal is divided into six equal time segments and the sample average for the mean, variance, skewness and kurtosis are calculated as set out in Table 1 below.

TABLE 1

Statistical moments (sample mean ± std. err. mean)[*] of unprocessed, spike attenuated (SA) and wavelet packet filtered (WPF) signals pertaining to FIG. 2.

| Signal | Process | Pruning Threshold | Mean | Variance | Skewness | Kurtosis |
|---|---|---|---|---|---|---|
| X1 | WPF | 0.0010 | −0.34 ± 0.42 | 6.54 ± 0.23 | 0.031 ± 0.037 | 2.810 ± 0.042 |
|  | — | — | −0.39 ± 0.32 | 12.5 ± 1.5 | 0.173 ± 0.071 | 2.787 ± 0.083 |
| X3 | — | — | 7.19 ± 0.31 | 181 ± 12 | 2.69 ± 0.11 | 11.05 ± 0.74 |
|  | WPF | 0.0055 | −0.25 ± 0.27 | 12.5 ± 1.0 | 0.94 ± 0.19 | 10.2 ± 1.6 |
|  | SA | — | 3.70 ± 0.24 | 26.0 ± 3.1 | 0.394 ± 0.091 | 2.82 ± 0.12 |
|  | SA + WPF | 0.0030 | 3.66 ± 0.36 | 6.45 ± 0.40 | 0.153 ± 0.041 | 2.829 ± 0.088 |

[*]n = 6 sequential time series intervals of 2000 pts.

For signals filtered using a wavelet packet filter technique such as the wavelet packet rhythm extraction method described in the above-incorporated Zalay et al. PCT application, the initial normalized interpeak interval variance threshold ($\theta_\lambda$) and power significance level ($\beta_P$) are set to 0.001 and 0.01, respectively. The subsequent pruning value of the interpeak interval variance threshold $\theta_\lambda$ determining the final tree is selected by minimizing the sum of squared errors between rhythmic signal X1 after wavelet packet filtering and the given signal, based on values of their four statistical moments. This is done to maximize similarity of the signals while at the same time avoiding an arbitrary choice of threshold, for purposes of comparison.

A two-sided paired t-test and a Wilcoxon signed ranked test are performed on the individual and combined statistical moments, excluding the mean, to determine whether the difference between rhythmic signal X1 after wavelet packet filtering and the various versions of composite complex signal X3 is statistically significant in each case. The mean is excluded because the initial addition of large amplitude bursting-spike signal X2 to rhythmic signal X1 introduces a non-rhythmic offset that is not removed by neural rhythm extraction; furthermore, this offset can easily be subtracted to correct for the difference in the means. The results of the hypothesis tests set out in Table 2 below confirm that complex composite signal X3 when processed initially using attenuator 10 and then subsequently wavelet packet filtered as shown in FIG. 6D does not differ significantly from rhythmic signal X1 after wavelet packet filtering for all categories tested, thereby confirming that the attenuator 10 is best suited to be used as a pre-processing stage to wavelet packet filtering when dealing with complex signals containing large amplitude spikes.

time-frequency plane. The spike attenuating loop 16 alone also removes the high-frequency components of the large amplitude spike bursts, but does not eliminate the low amplitude baseline rhythm associated with them as shown in FIG. 6C.

Large amplitude spikes or artifacts interfere with the extraction and separation of baseline rhythms because their dominant spectral power masks other smaller-amplitude features. Besides the utilitarian reasons for dispensing with large amplitude spikes/artifacts, isolation of the non-rhythmic baseline complex signal may itself be of interest, due to active research into forms of (subthreshold) neuronal noise and their role in synaptic function and neuronal communication. The performance of wavelet packet filtering in the presence of large amplitude spikes is comparable to the performance of conventional filtering, in that they are both inadequate. To address this shortcoming, the attenuator 10 works well as a preprocessing stage to wavelet packet filtering. In contrast to previous techniques of large amplitude spike removal, attenuator 10 does not rely on excision or filtering; rather, it iteratively updates a scaled mirror image of the target large amplitude spike which it uses to selectively attenuate or "melt" the large amplitude spike away, thereby eliminating the large amplitude spike's broad spectral footprint while preserving the baseline complex signal. As a result, the attenuator 10 minimizes signal distortion and information loss, which is important for subsequent wavelet packet filtering.

The attenuator 10 can be implemented in software that is run on a general purpose computing device such as for example a personal computer (PC) or other digital electronic hardware or can be implemented on a logic processing device such as for example a field programmable gate array (FPGA) or application specific intergrated circuit (ASIC), for either

TABLE 2

Two-sided paired t-test (TT) and Wilcoxon signed rank test (WT) p values.[*]

| Signal | Process | Variance | | Skewness | | Kurtosis | | Combined | |
|---|---|---|---|---|---|---|---|---|---|
|  |  | TT | WT | TT | WT | TT | WT | TT | WT |
| X1 | — | 0.011 | 0.031 | 0.16 | 0.31 | 0.75 | 0.68 | 0.025 | 0.014 |
| X3 | — | 2.7 × 10⁻⁵ | 0.031 | 3.7 × 10⁻⁶ | 0.031 | 0.00011 | 0.031 | 0.0060 | 0.00020 |
|  | WPF | 0.0013 | 0.031 | 0.0051 | 0.031 | 0.0051 | 0.031 | 4.9 × 10⁻⁵ | 0.00020 |
|  | SA | 0.0013 | 0.031 | 0.013 | 0.031 | 0.93 | 0.84 | 0.013 | 0.0038 |
|  | SA + WPF | 0.85 | 0.84 | 0.13 | 0.22 | 0.87 | 1 | 0.89 | 0.37 |

Comparison is against X1 WPF with respect to statistical moments (excluding the mean).

[*]p values that do not reject the null hypothesis at 5% significance are bolded.

Figure 6B:
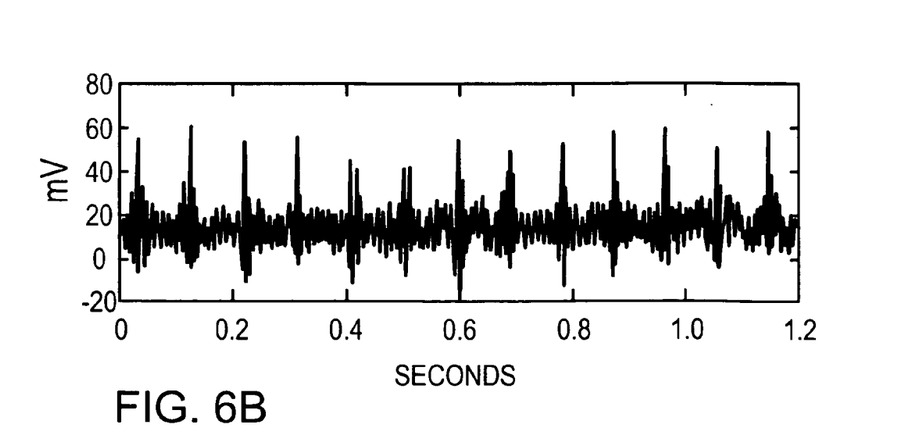
FIG. 6B shows the composite complex signal of FIG. 6A after filtering using a wavelet packet filter.
Figure 6C:
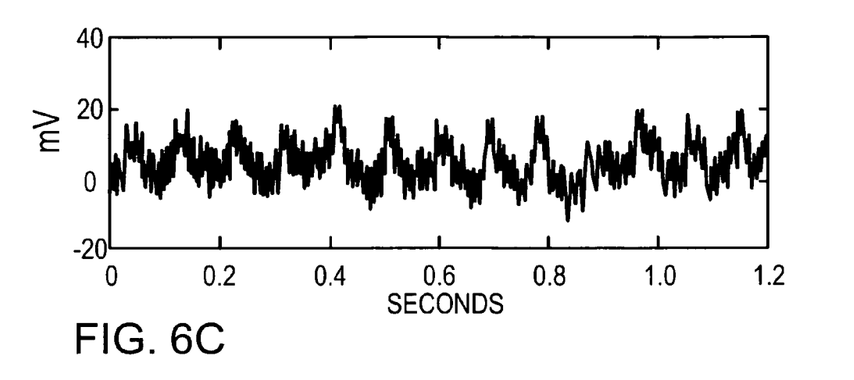
FIG. 6C shows the composite complex signal of FIG. 6A after processing by the spike attenuating loop of FIG. 1C.
Figure 6D:
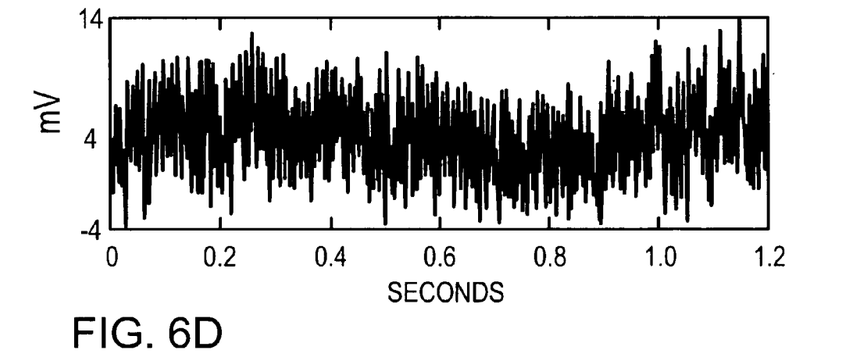
FIG. 6D shows the composite complex signal of FIG. 6A after processing by the spike attenuating loop of FIG. 1C followed by filtering using a wavelet packet filter.
Figure 6E:
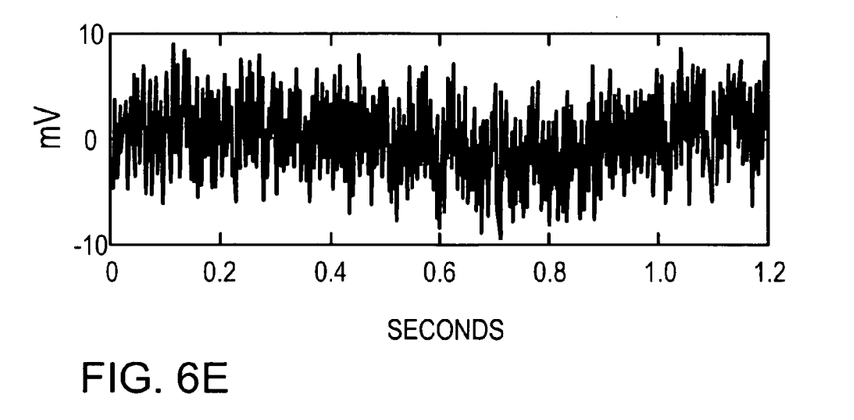
FIG. 6E shows the rhythmic signal forming part of the composite complex signal of FIG. 6A after filtering using a wavelet packet filter.

FIG. 6B shows that composite complex signal X3 after wavelet packet filtering without attenuating reduces much of the signature of the large amplitude spike bursts, but at the expense of removing too much of the complex signal from the offline or online processing of complex signals. The general purpose computing device comprises, for example, a processing unit, system memory (volatile and/or non-volatile memory), other removable or non-removable memory (hard drive, RAM, ROM, EEPROM, CD-ROM, DVD, flash memory, etc.), and a system bus coupling various components to the processing unit. In the software implementation, the processing unit runs program modules including but not limited to routines, programs, object components, data structures etc. that may be embodied as computer readable program code stored on a computer readable medium. A computer readable medium is any data storage device that can store data, which can thereafter be read by a computer system. Examples of computer readable medium include for example read-only memory, random-access memory, flash memory, CD-ROMs, magnetic tape, optical data storage devices and other storage media. The computer readable program code can also be distributed over a network including coupled computer systems so that the computer readable program code is stored and executed in a distributed fashion or copied over a network for local execution.

Although the attenuator 10 is described above with specific reference to the processing of a biological signal and in particular to a recorded neural signal, those of skill in the art will appreciate that the attenuator 10 may be employed in virtually any environment where it is desired to attenuate large amplitude spikes in a complex signal. For example, attenuation of large amplitude spikes or artifacts may be desirable in wireless/wired communications signals, measurement or detector device signals (e.g. spectrometer signals, radar signals, acoustic transducer signals, etc.), environmental signals (atmospheric signals, oceanic signals, seismic signals, astronomic signals etc.) or as a pre-processing step to other signal processing applications such as filtering, transforms, subspace methods, blind-channel identification, unsupervised learning (e.g. clustering), classification and/or tracking.

In addition, the attenuator 10 is not limited to the processing of recorded complex signals. Incoming complex signals may also processed generally in "real-time" or "online". In this case, to adapt the attenuator 10 for online processing of complex signals, a memory buffer is employed to store prior samples of the complex signal corresponding to a sufficiently large moving time window (interval), allowing for a running update to the thresholds and computation of the inverse scaled images and sigmoidal envelopes.

If desired, as a pre-processing spike attenuating loop step, the minimum of the non-negative complex signal segment $\min\{\tilde{x}(\hat{k})\}$ may be subtracted from the values of the non-negative complex signal segment before the non-negative complex signal segment $\tilde{x}(\hat{k})$ is applied to the spike attenuating loop 16. In this case, the minimum of the non-negative complex signal segment is added back to the attenuated non-negative complex signal segment before the attenuated complex signal is applied to adder 18.

Those of skill in the art will also appreciate that other variations and modifications from those described may be made without departing from the scope and spirit of the invention, as defined by the appended claims.

What is claimed is:

1. An attenuator for attenuating spikes in a complex signal comprising:
   a spike detector configured to detect spikes in the complex signal; and
   a spike attenuator configured to attenuate each detected spike, said spike attenuator including an envelope detector configured to fit an envelope around each detected spike,
   the spike attenuator including an inverse signal generator configured to generate, for each detected spike fitted with an envelope, an estimate inverse signal and a multiplier configured to apply the estimate inverse signal to the detected spike to attenuate the detected spike.

2. The attenuator of claim 1 wherein said spike detector is configured to compare the amplitude of the complex signal with a threshold value to detect spikes in the complex signal.

3. The attenuator of claim 2 wherein the threshold value is a function of the complex signal.

4. The attenuator of claim 3, wherein the threshold value is proportional to the root mean square of the complex signal.

5. The attenuator of claim 2 wherein,
   said spike attenuator is configured to generate, for each detected spike, a scaled mirror image of the detected spike,
   the spike attenuator further includes a comparator configured to compare the attenuated spike with another threshold value and a feedback path that feeds the attenuated spike back to the envelope detector when the attenuated spike exceeds the another threshold value.

6. The attenuator of claim 5 wherein said complex signal is a biological signal.

7. The attenuator of claim 6 wherein said biological signal is one of a neural signal and a cardiac signal.

8. The attenuator of claim 5, wherein the envelope detector fits a sigmoidal envelope around each detected spike.

9. The attenuator of claim 5, wherein the attenuated spike, when equal to or less than said another threshold value, has an amplitude that is equal to or less than an average complex signal baseline activity in its neighborhood.

10. The attenuator of claim 1 further comprising:
    a memory array configured to digitally store the values of said complex signal, said spike detector, for each value of said complex signal, configured to compare the value to a plurality of preceding and subsequent values of said complex signal to determine if said value represents a peak and if so, compare the value of the complex signal with a threshold value to determine if said value represents a spike.

11. The attenuator of claim 10 wherein the threshold value is a function of the complex signal.

12. The attenuator of claim 11, wherein the threshold value is proportional to the root mean square of the complex signal.

13. The attenuator of claim 1 wherein,
    the inverse signal generator is configured to generate, for each detected spike, a scaled mirror image of the detected spike
    the spike attenuator further includes a comparator configured to compare the attenuated spike with a threshold value and a feedback path that feeds the attenuated spike back to the envelope detector when the attenuated spike exceeds the threshold value.

14. The attenuator of claim 13, wherein the envelope detector fits a sigmoidal envelope around each detected spike.

15. The attenuator of claim 13, wherein the attenuated spike, when equal to or less than said threshold value, has an amplitude that is equal to or less than the average complex signal baseline activity in its neighborhood.

16. The attenuator of claim 1 wherein said complex signal is a biological signal.

17. The attenuator of claim 16 wherein said biological signal is one of a neural signal and a cardiac signal.

18. The attenuator of claim 2 further comprising:
    a memory array configured to digitally store the values of said complex signal, said spike detector, for each value of said complex signal, configured to compare the value to a plurality of preceding and subsequent values of said complex signal to determine if said value represents a peak and if so, compare the value of the complex signal with the threshold value to determine if said value represents a spike.

19. The attenuator of claim 18 wherein said complex signal is a biological signal.

20. The attenuator of claim 19 wherein said biological signal is one of a neural signal and a cardiac signal.

21. The attenuator of claim 1, wherein the envelope detector fits a sigmoidal envelope around each detected spike.

22. An attenuator for attenuating spikes in a complex signal comprising:
- a spike detector configured to detect spikes in the complex signal by comparing the amplitude of the complex signal with a first threshold value; and
- a spike attenuator configured to attenuate detected spikes in said complex signal, for each spike to be attenuated, said spike attenuator configured to generate and iteratively apply scaled inverse signals to the complex signal to attenuate the spike,
- wherein the spike attenuator includes,
  - an envelope detector configured to fit an envelope around each spike to be attenuated,
  - an inverse signal generator configured to generate a scaled inverse signal of each spike,
  - a multiplier configured to combine each spike to be attenuated with an associated scaled inverse signal to generate an attenuated spike,
  - a comparator configured to compare the attenuated spike with a second threshold value and
  - a feedback path configured to feed the attenuated spike back to the envelope detector when the attenuated spike exceeds the second threshold value.

23. The attenuator of claim 22 wherein the first threshold value is a function of the complex signal.

24. The attenuator of claim 23, wherein the first threshold value is proportional to the root mean square of the complex signal.

25. The attenuator of claim 22 further comprising:
- a memory array configured to digitally store the values of said complex signal, said spike detector, for each value of said complex signal, configured to compare the value to a plurality of preceding and subsequent values of said complex signal to determine if said value represents a peak and if so, compare the value of the complex signal with the threshold value to determine if said first value represents a spike.

26. The attenuator of claim 22, wherein the envelope detector fits a sigmoidal envelope around each spike to be attenuated.

27. The attenuator of claim 22, wherein the attenuated spike, when equal to or less than said second threshold value, has an amplitude that is equal to or less than an average complex signal baseline activity in its neighborhood.

28. The attenuator of claim 22, wherein said complex signal is a biological signal.

29. The attenuator of claim 28, wherein said biological signal is one of a neural signal and a cardiac signal.

* * * * *